C. W. WOODFORD.

Assignor to C. B. BEACH.

Horseshoe-Nail Machine.

No. 7,956. Reissued Nov. 20, 1877.

Witnesses

Francis L. Clark

Claudius L. Parker

Inventor

Charles W. Woodford,

By Attorney

George H. Christy for him and his Assignee.

N. PETERS, PHOTO-LITHOGRAPHER, WASHINGTON, D. C.

UNITED STATES PATENT OFFICE.

CHARLES W. WOODFORD, OF MONTREAL, QUEBEC, CANADA, ASSIGNOR TO CLIFTON B. BEACH, OF CLEVELAND, OHIO.

IMPROVEMENT IN HORSESHOE-NAIL MACHINES.

Specification forming part of Letters Patent No. 124,411, dated March 5, 1872; Reissue No. 7,956, dated November 20, 1877; application filed May 17, 1877.

*To all whom it may concern:*

Be it known that I, CHARLES WELLINGTON WOODFORD, of Montreal, in the district of Montreal, and Province of Quebec, Canada, have invented certain Improvements in the Manufacture of Horseshoe-Nails, and in mechanism for cutting the same; and I do hereby declare that the following is a full, clear, and exact description of the same, such as will enable others skilled in the art to make, use, and operate the same, reference being had to the accompanying drawings, making a part of this specification, and to the letters of reference marked thereon.

This invention has for its object the cutting of horseshoe-nails from previously prepared metallic plates; and consists in the method of operation hereinafter described and claimed, by which the nails and intermediate waste pieces are cut alternately from the end of the plate by the alternate action of properly-shaped cutters; and it further consists in an improved construction and arrangement of bed-knives and cutters, by the joint operation of which waste and nails are severed alternately from the plate, as will be more fully described.

Figure 1:
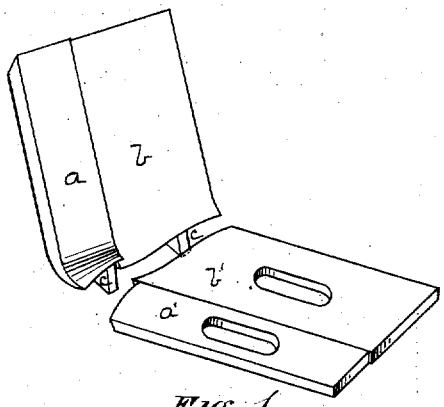
Figure 2:
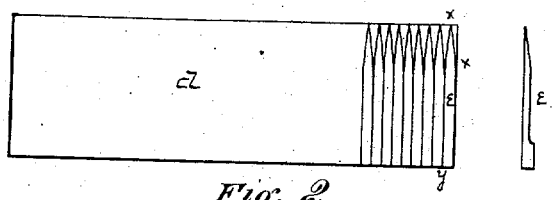

In the drawing, Figure 1 represents, in perspective, a front and upper face view of the cutters and bed-knives; and Fig. 2, a plan and end view of the plate from which the nails are cut, and also showing the lines of cut.

*a b* represent the cutters, and *a′ b′* the bed-knives. The cutters *a b*, by means of any suitable mechanism, receive the proper motion to enable them to operate, in connection with the bed-knives, in cutting nail and waste alternately.

The outline of the cutting-edge of the cutter *a* and of the bed-knife *a′*, which corresponds with it, is adapted to cut the corner of the plate of metal *d* presented to it along the line *x x* of Fig. 2, and thereby form one edge of the tapering point of the nail which is next to be cut off by the cutter *b*. The outline of the cutting-edge of the cutter *b* and of the bed-knive *b′*, which corresponds with it, is adapted to cut off a nail, *e*, from the end of the plate *d*, cutting along the line *x y*, as indicated, also, in Fig. 2.

The operation is as follows: The cutters having been given the proper movement in any suitable manner, a plate of metal is presented to them, its proper feed being determined by the guides *c c*. The plate being first acted upon by the cutter *a* has its corner severed upon the line *x x*. Its position then being changed by any suitable mechanism, it is presented to the cutter *b*, which severs a portion upon the line *x y*, the severed portion forming a blank for a nail. The plate itself should be previously brought into proper form, as indicated by the end view, Fig. 2.

This operation is then repeated, *a a′* cutting off the waste intermediate between each two nails or nail-blanks, and *b b′* cutting off the latter, such cutting operations alternating regularly.

By means of this construction and operation, I am enabled to cut horseshoe-nails, with their long tapering form, from a plate of metal—a result impossible with the ordinary nail-cutting machinery.

Having thus described my invention, what I claim as new, and desire to secure by Letters Patent, is—

1. The method of severing or dividing nail-plates into horseshoe-nails or nail-blanks by cutting waste and nail alternately from the end of the plate by the alternate action of properly-shaped cutters and bed-knives, substantially as set forth.

2. The cutters *a b* and bed-knives *a′ b′*, adapted, by their joint operation, to cut, from a plate of metal, horseshoe-nails with long tapering points, substantially as described.

In testimony whereof I have hereunto set my hand.

CHARLES WELLINGTON WOODFORD.

Witnesses:
JAMES LESLIE,
JAMES GAULT.